UNITED STATES PATENT OFFICE.

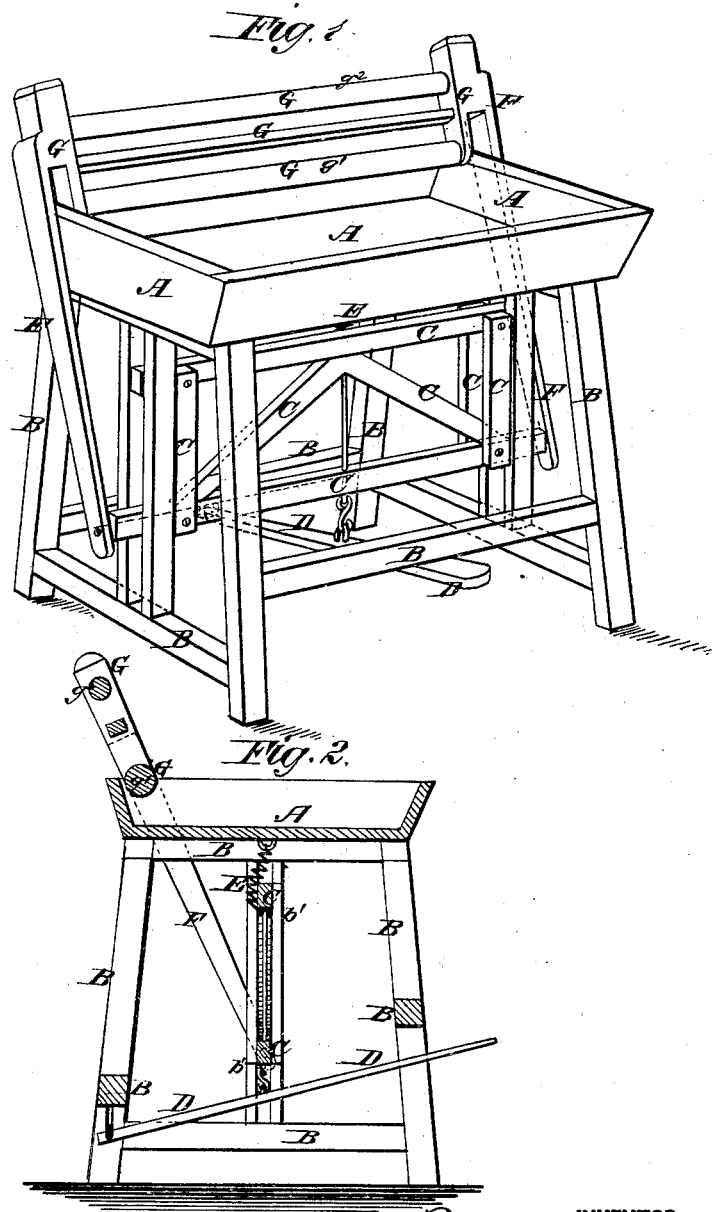

PATRICK ROONEY, OF FAIRFIELD, VERMONT.

IMPROVEMENT IN BUTTER-WORKERS.

Specification forming part of Letters Patent No. 168,418, dated October 5, 1875; application filed June 19, 1875.

*To all whom it may concern:*

Be it known that I, PATRICK ROONEY, of Fairfield, in the county of Franklin and State of Vermont, have invented a new and useful Improvement in Butter-Workers, of which the following is a specification:

Figure 1 is a perspective view of my improved butter-worker. Fig. 2 is a vertical cross-section of the same.

Similar letters of reference indicate corresponding parts.

The object of this invention is to furnish an improved machine for working butter, to work out the milk and work in the salt, and which shall be simple in construction, convenient in use, and effective in operation.

The invention consists in the combination of the sliding frame, the treadle and spring, the pivoted bars, and the top or working frame with the tray and its supporting-frame, as hereinafter fully described.

A is a shallow tray, of convenient length and breadth, and which is attached to the top of a frame, B. C is a frame, the ends of which work between vertical guide-bars $b'$, attached to the end parts of the frame B. D is a treadle, the middle part of which is connected with the center of the bottom bar of the frame C by a link rod or chain, and its rear end is pivoted to the lower rear part of the frame B. The forward end of the treadle D projects into such a position that it can be conveniently reached and operated by the operator with his foot to draw down the frame C. The frame C is raised, when the downward pressure upon the treadle D is removed, by a spring, E, the lower end of which is attached to the upper middle part of the said frame C, and its upper end is attached to the bottom of the tray A. The ends of the bottom bar of the frame C project, and to them are pivoted the lower ends of the two bars F. Upon the inner side of the upper ends of the pivoted bars F are formed, or to them are attached, projections, to which are rigidly attached the ends of a frame, G, in such a way that the lower part of said frame, when lowered, may enter the tray A and rest upon its bottom. The lower bar $g^1$ of the frame G is rounded off to work the butter, and the top bar $g^2$ is rounded off to serve as a handle.

In using the machine the butter is placed in the tray A, and the frame G is guided by grasping the bar $g^2$, to cause the bar $g^1$ to descend in any desired part of the tray A when drawn down by pressure upon the treadle D.

Having thus described my invention, I claim as new and desire to secure by Letters Patent—

The combination of the frame C, the treadle D, the spring E, the pivoted bars F, and the frame G with the tray A and frame B, substantially as herein shown and described.

PATRICK ROONEY.

Witnesses:
 JOHN ROONEY,
 B. W. NORTHROP.